US012045594B2

(12) United States Patent
Amundson et al.

(10) Patent No.: US 12,045,594 B2
(45) Date of Patent: Jul. 23, 2024

(54) APPLICATION DEPLOYMENT PLATFORM

(71) Applicant: Target Brands, Inc., Minneapolis, MN (US)

(72) Inventors: Michael J. Amundson, Roseville, MN (US); Daniel P. Woods, Brooklyn Park, MN (US); John R. Engelman, Edina, MN (US); James M. Westover, St. Louis Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 283 days.

(21) Appl. No.: 17/701,104

(22) Filed: Mar. 22, 2022

(65) Prior Publication Data
US 2022/0326925 A1 Oct. 13, 2022

Related U.S. Application Data

(60) Provisional application No. 63/171,831, filed on Apr. 7, 2021.

(51) Int. Cl.
*G06F 9/44* (2018.01)
*G06F 8/36* (2018.01)
(Continued)

(52) U.S. Cl.
CPC .................. *G06F 8/60* (2013.01); *G06F 8/36* (2013.01); *G06F 8/71* (2013.01); *G06F 9/455* (2013.01)

(58) Field of Classification Search
CPC ...... G06F 9/5072; G06F 8/61; G06F 9/45533; G06F 8/65; G06F 9/45558; G06F 8/70;
(Continued)

(56) References Cited

U.S. PATENT DOCUMENTS 8,010,777 B2  8/2011  Nandan et al.
8,190,682 B2  5/2012  Paterson-Jones et al.
(Continued)

FOREIGN PATENT DOCUMENTS

WO     2017046635 A1    3/2017

OTHER PUBLICATIONS

Woods, Meet Target's Stores Deployment Interface that Realizes Distributed Edge Computing at Retail Scale, https://tech.target.com/infrastructure/2018/06/20/enter-unimatrix.html, 9 pages, 2018.

*Primary Examiner* — Thuy Dao
(74) *Attorney, Agent, or Firm* — Theodore M. Magee; Westman, Champlin & Koehler, P.A.

(57) ABSTRACT

A computer-implemented method includes defining a deployment pipeline for each application of a collection of applications, the deployment pipeline comprising an ordered plurality of waves of deployment wherein the ordered plurality of waves of deployment comprises a set wave of deployment and a variable wave of deployment with the set wave of deployment comprising deployment to a plurality of locations that is the same for each application in the collection of applications. For each application in the collection of applications, a list of locations selected by a respective user for the variable wave of deployment is received such that two applications of the collection of applications deploy to different locations during their respective variable wave of deployment. An indication that the build of the application has been created is received and in response, one of the plurality of waves of deployment is executed.

17 Claims, 21 Drawing Sheets

(51) Int. Cl.
*G06F 8/60* (2018.01)
*G06F 8/71* (2018.01)
*G06F 9/455* (2018.01)
*G06F 11/36* (2006.01)
*H04L 29/08* (2006.01)

(58) Field of Classification Search
CPC .......... G06F 11/0709; G06F 8/60; G06F 8/77; G06F 8/41; G06F 8/24; G06F 8/71; G06F 11/3409; G06F 11/3476; G06F 11/3688; G06F 11/302; H04L 47/70; H04L 41/082; H04L 67/34; H04L 41/0813; H04L 67/51
See application file for complete search history.

(56) References Cited

U.S. PATENT DOCUMENTS

| | | |
|---|---|---|
| 8,589,554 B2 | 11/2013 | Kelkar et al. |
| 8,843,935 B2 | 9/2014 | Hegdal et al. |
| 10,198,281 B2 | 2/2019 | Thakkar et al. |
| 10,681,176 B1 * | 6/2020 | Lewis ........................ G06F 8/60 |
| 2011/0209140 A1 * | 8/2011 | Scheidel ............. G06F 9/45558 717/172 |

* cited by examiner

DASHBOARD   DOCUMENTATION

Create an Application

Application Name

This must be lowercase letters and numbers only

| mynextdemo | | ✓ Available |

— 502
— 504

ID

This must be the Configuration item ID for this project as provisioned in ID

| Ex, CI12345678 | | ⊘ IDs must be "CI" followed by 8 digits |

TEAM

Choose a Team to manage the application. Only members of the Team will have access to view and modify the app Available Teams:

| platform | support | spinnaker | Z002YTJ |

← 506

Application Details

These are optional, but recommended

Contact email

Description of Application

Contact email

Description of Application

Organizations

A new repository will be created from this Application in your account or an organization of your choice Available organizations

| USER'S ACCOUNT | ORG. 1 ACCOUNT | ORG. 2 ACCOUNT | ORG. 3 ACCOUNT |

| ORG. 4 ACCOUNT | ORG. 5 ACCOUNT |

600

GO BACK    CONTINUE

FIG. 6

DASHBOARD DOCUMENTATION

Application Created

Mynextdemo is now ready

Z002YTJ/mynextdemo

Overview | Clusters

Constraints Cancel

Constrains inform the platform where the workload for this cluster should be place when deployed

Computer Class

[ datacenter ◆ ]

This specifies the class of computer to host the workload.
Default: datacenter

Pool Type

[ genpop ◆ ]

This specifies the compute capacity to utilize on the platform. This can be used to access reserved capacity or network isolated compute
Default: genpop

Provider Type

[ container ◆ ]

This specifies the workload runtime. The platform will handle mapping your workload the format for the underlying provider
Default: container

Proxy

[ disabled ◆ ]

This specifies if the workload should contain a sidecar that is configured to receive the HTTP request for the workload
Default: disabled

APPLICATION DEPLOYMENT PLATFORM

CROSS-REFERENCE TO RELATED APPLICATION

The present application is based on and claims the benefit of U.S. provisional patent application Ser. No. 63/171,831, filed Apr. 7, 2021, the content of which is hereby incorporated by reference in its entirety.

BACKGROUND

In continuous integration/continuous deployment systems, programmers write and update source code for an application. When the source code is ready for deployment, the code is committed to a source code repository. The source code is then converted into a deployable image that is stored in a binary repository. Deployment software determines what machines the deployable image is to be deployed to and coordinates the deployment of the image to those machines.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes defining a deployment pipeline for each application of a collection of applications, the deployment pipeline comprising an ordered plurality of waves of deployment wherein the ordered plurality of waves of deployment comprises a set wave of deployment and a variable wave of deployment with the set wave of deployment comprising deployment to a plurality of locations that is the same for each application in the collection of applications. For each application in the collection of applications, a list of locations selected by a respective user for the variable wave of deployment is received such that two applications of the collection of applications deploy to different locations during their respective variable wave of deployment. An indication that the build of the application has been created is received and in response, one of the plurality of waves of deployment is executed.

In accordance with a further embodiment, a machine includes a memory and a processor executing instructions providing a deployment pipeline controller. The deployment pipeline controller provides a sequence of deployment steps for a build of an application with the deployment steps including a user-defined step in which the build is deployed to a plurality of systems selected by a user and a universal step in which the build is deployed to a plurality of systems selected for all builds that use the deployment pipeline controller.

In accordance with a still further embodiment, a method includes receiving an indication of a build of an application and executing at least part of a sequence of deployments of the build. The sequence of deployments includes executing a deployment of the build to a set of computing systems designated specifically for the application and only after deployment of the build to the set of computing systems designated specifically for the application, executing a deployment of the build to a set of computing systems designated for all applications that utilize the sequence of deployments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is an example a user interface for setting a name for a new application.

FIG. 6 is an example of a user interface for selecting a repository account.

FIG. 9 is an example user interface for selecting a class of computers to deploy to.

FIG. 21 is a block diagram of a computing system that various aspects of the embodiments are implemented on.

DETAILED DESCRIPTION

In continuous integration/continuous deployment systems, software is constantly being updated and deployed. Usually, applications are deployed to a development environment where they can be tested before being deployed to machines in a production environment. In some large enterprises, an application needs to be deployed to thousands of computer systems in the production environment of the enterprise. However, deploying to all of the computer systems in the production environment immediately after testing in the development environment can result in large numbers of faults since the computer systems in the production environment can have different configurations than the computer systems of the development environment and some computer systems in the production environment can receive different data than is provided to the computer systems in the development environment.

Embodiments described below provide an application platform that requires each application to follow a deployment pipeline consisting of a sequence of deployment waves. In each wave, a latest build of an application is deployed to a different collection of computer systems. Instead of providing a fixed set of computer systems for each wave, the embodiments allow the application's software programmers to designate which computer systems the application is deployed to some of the deployment waves. The number of computer systems that a user is able to deploy the image to is limited so as to reduce the impact that a faulty deployable image has on the entire enterprise. After a wave of deployment has been successfully accomplished, the user may request the next wave of deployment in the sequence of waves. In the latter waves of deployment, fixed sets of computer systems are designated for the wave to ensure that the application is operable in the various different types of computer systems in the enterprise. In the last wave of deployment, the application is deployed to all computer systems within a particular class selected by the user.

Figure 1:
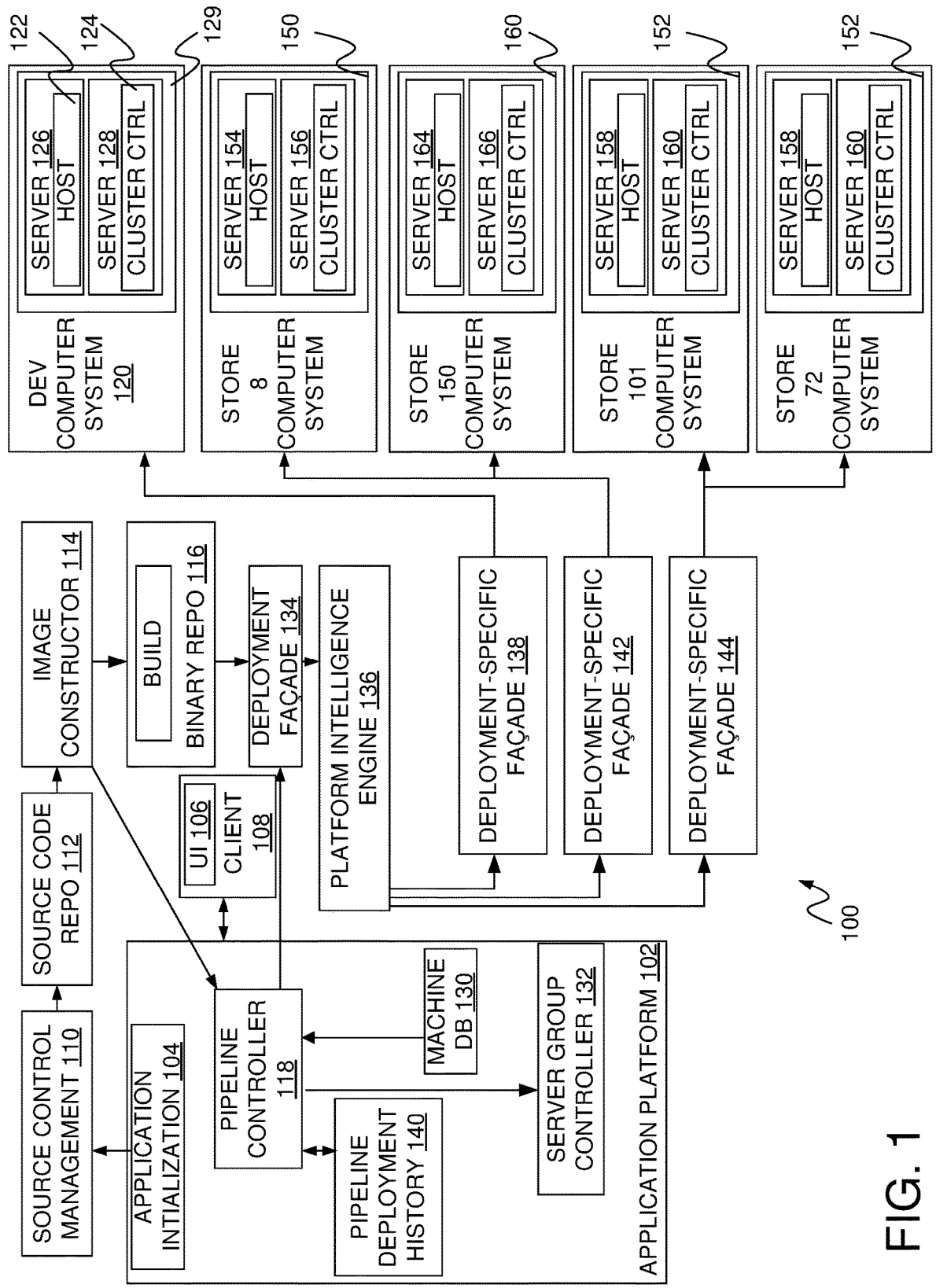
FIG. 1 is block diagram of a deployment system in accordance with one embodiment.
Figure 2:
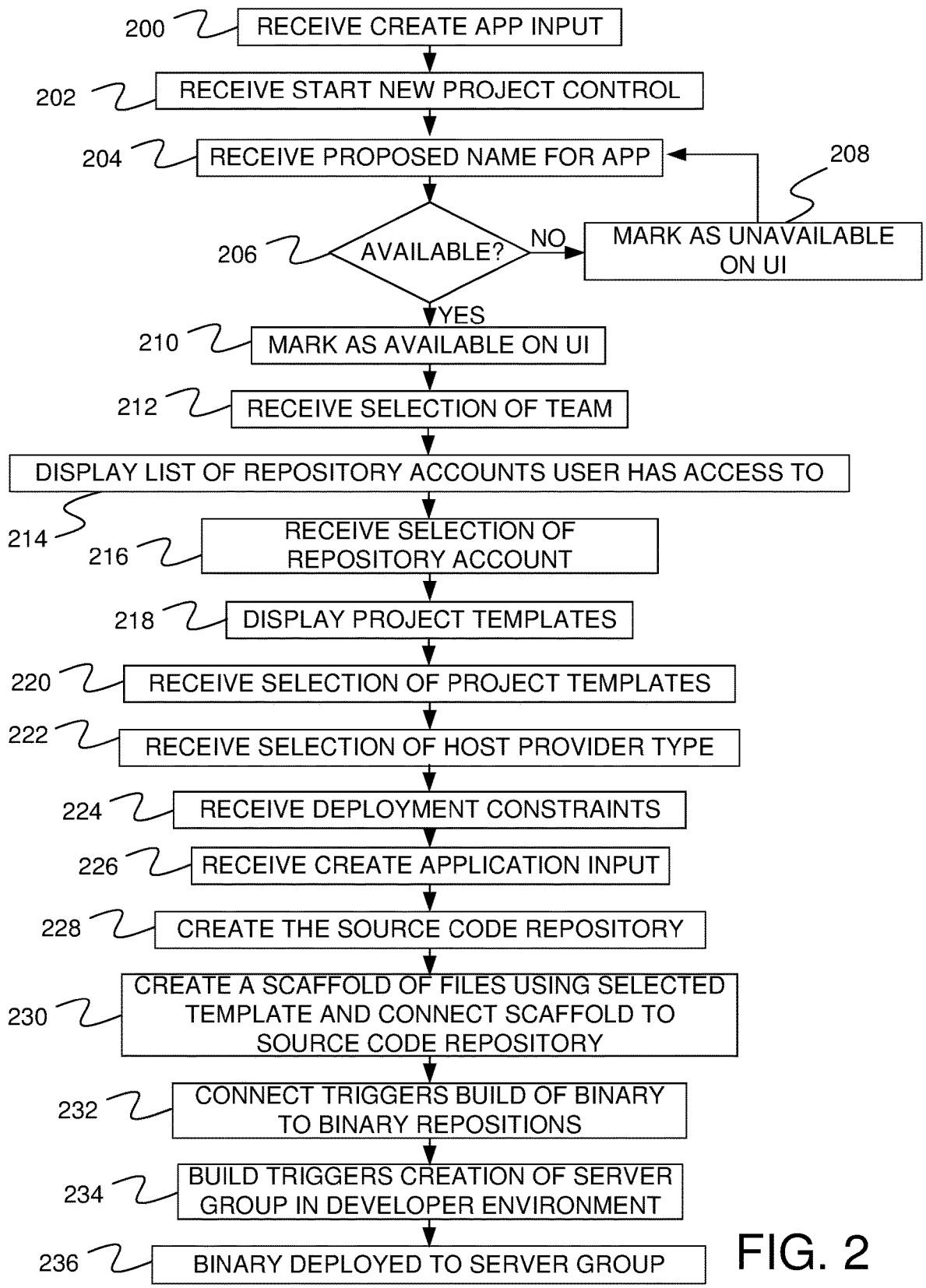
FIG. 2 is a flow diagram of a method of initializing an application for development and deployment.
Figure 3:
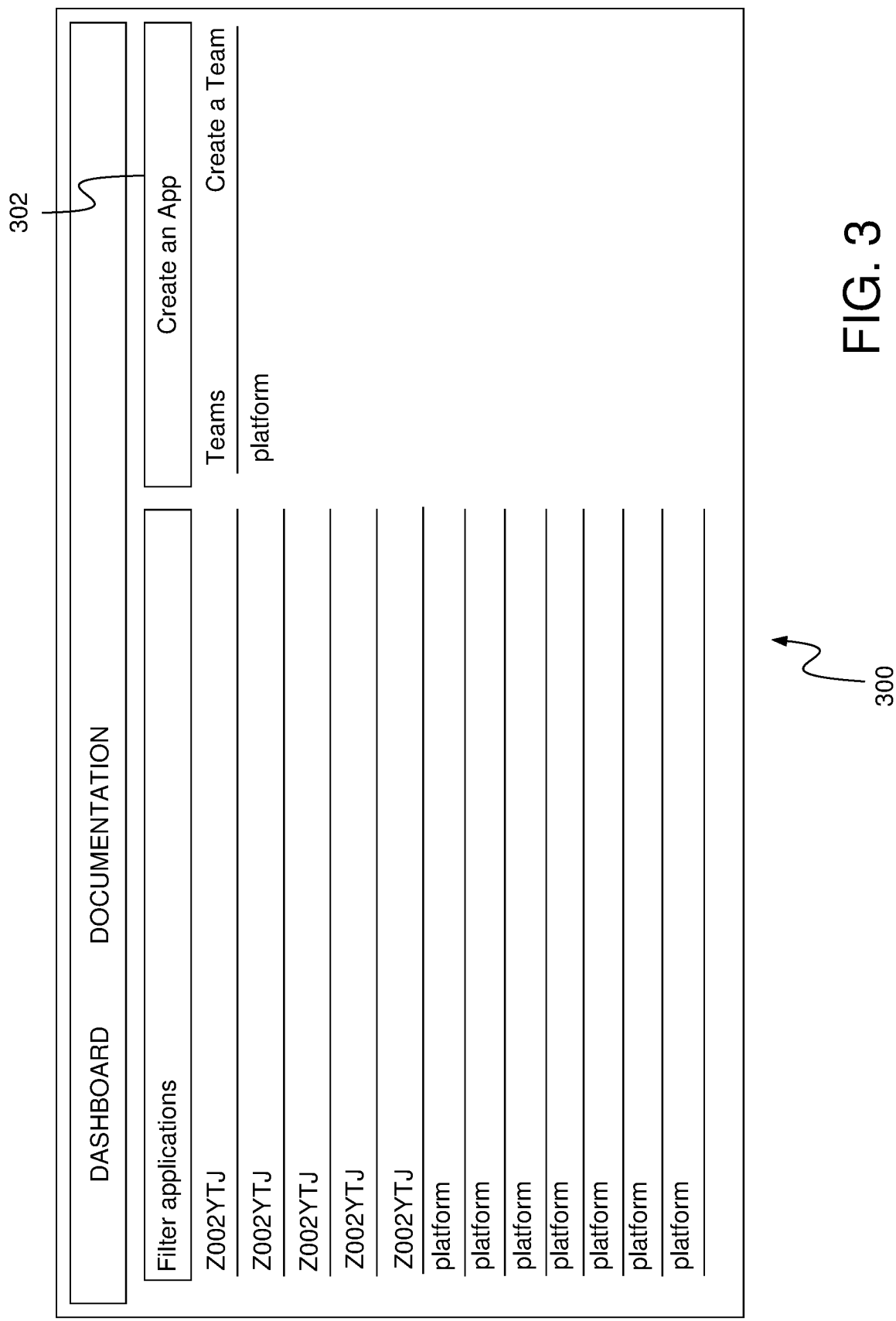
FIG. 3 is an example of a user interface for starting the creation of an application.

FIG. 1 provides a block diagram of a software development and deployment system 100 in accordance with one embodiment. FIG. 2 provides a flow diagram for starting a new project in system 100. In FIG. 1, an application platform 102 includes an initialization module 104 used to create and deploy an initial version of a new project. Initialization module 104 creates a user interface 106 that is displayed on a client device 108. FIG. 3 provides an example of a user interface 300 that is initially provided by initialization module 104. User interface 300 includes a create application control 302 that can be selected by a user of client device 108.

Figure 4:
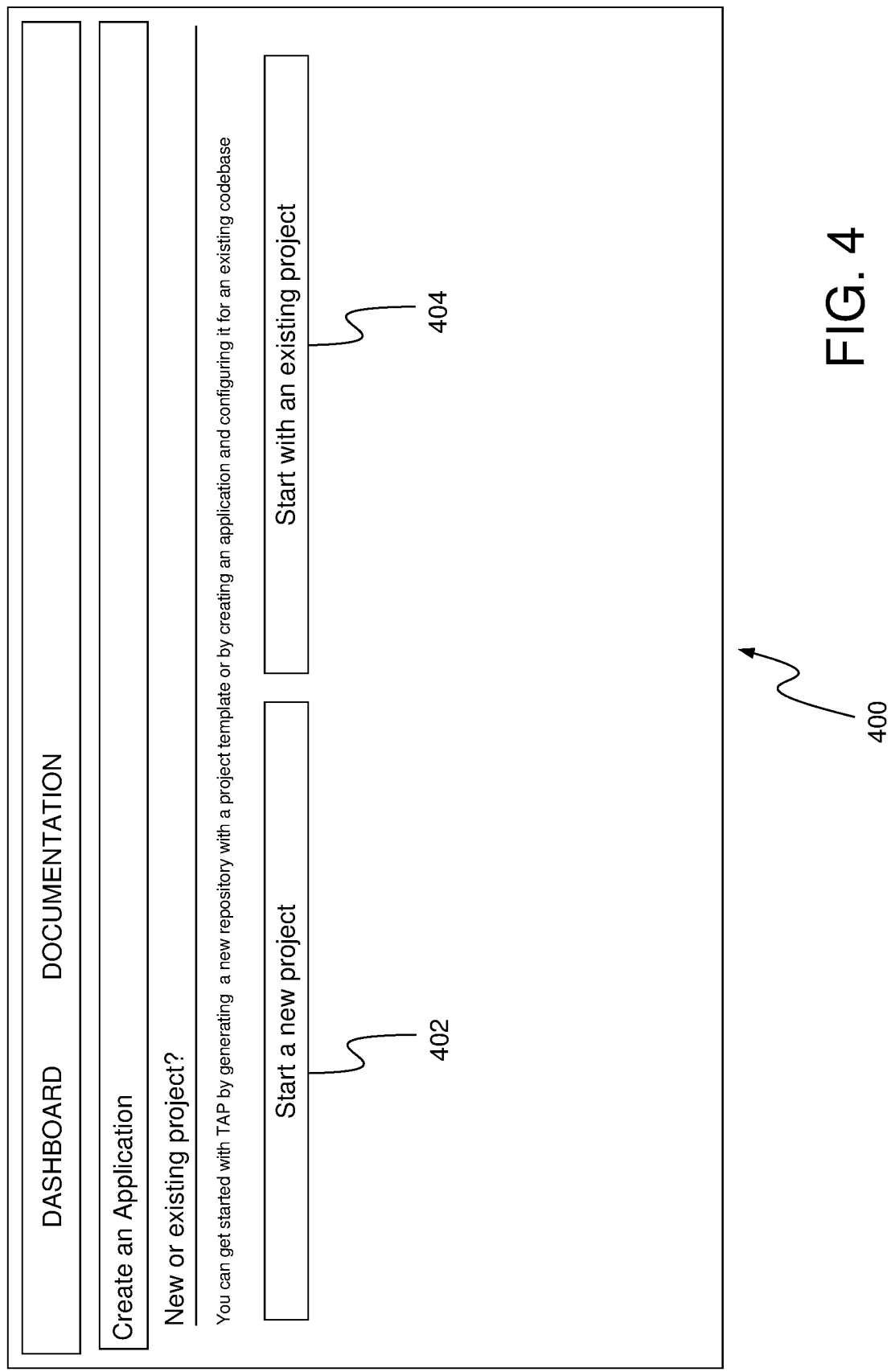
FIG. 4 is an example of a user interface for selecting between starting a new project and using an existing project.

At step 200 of FIG. 2, selection of create application control 302 is received by initialization module 104. In response to receiving this control, initialization module 104 generates user interface 400 of FIG. 4 that allows a user to start a new project using control 402 or create an application based on an existing project using control 404. At step 202, initialization module 104 receives an input indicating that the start new project control 402 has been selected in FIG. 4.

In response to receiving the selection of control 402, initialization module 104 displays user interface 500 of FIG. 5. User interface 500 includes a textbox 502 in which a user may type in a proposed name for the new application. At step 204, initialization module 104 receives the proposed name for the application. At step 206, initialization module 104 determines if the proposed name is available. In accordance with one embodiment, each application name is required to be unique in application platform 102. If the name is not available, user interface 500 is updated to mark the name as unavailable at step 208 and the process returns to step 204 where it receives a new proposed name. When the proposed name is determined to be available at step 206, user interface 500 is updated to mark the name as available as indicated by designation 504 in user interface 500.

Figure 7:
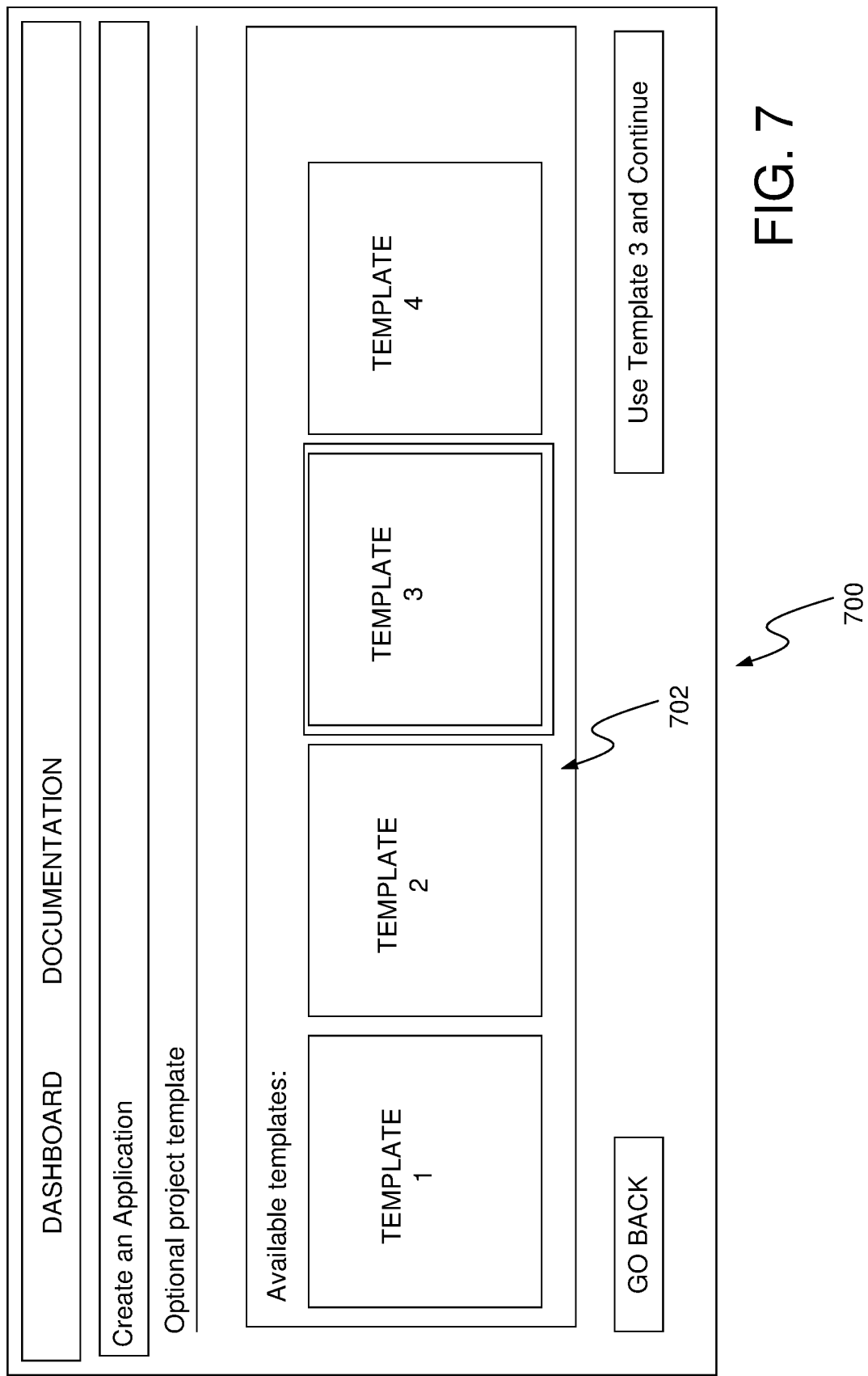
FIG. 7 is an example user interface for selecting a template for the new application.
Figure 8:
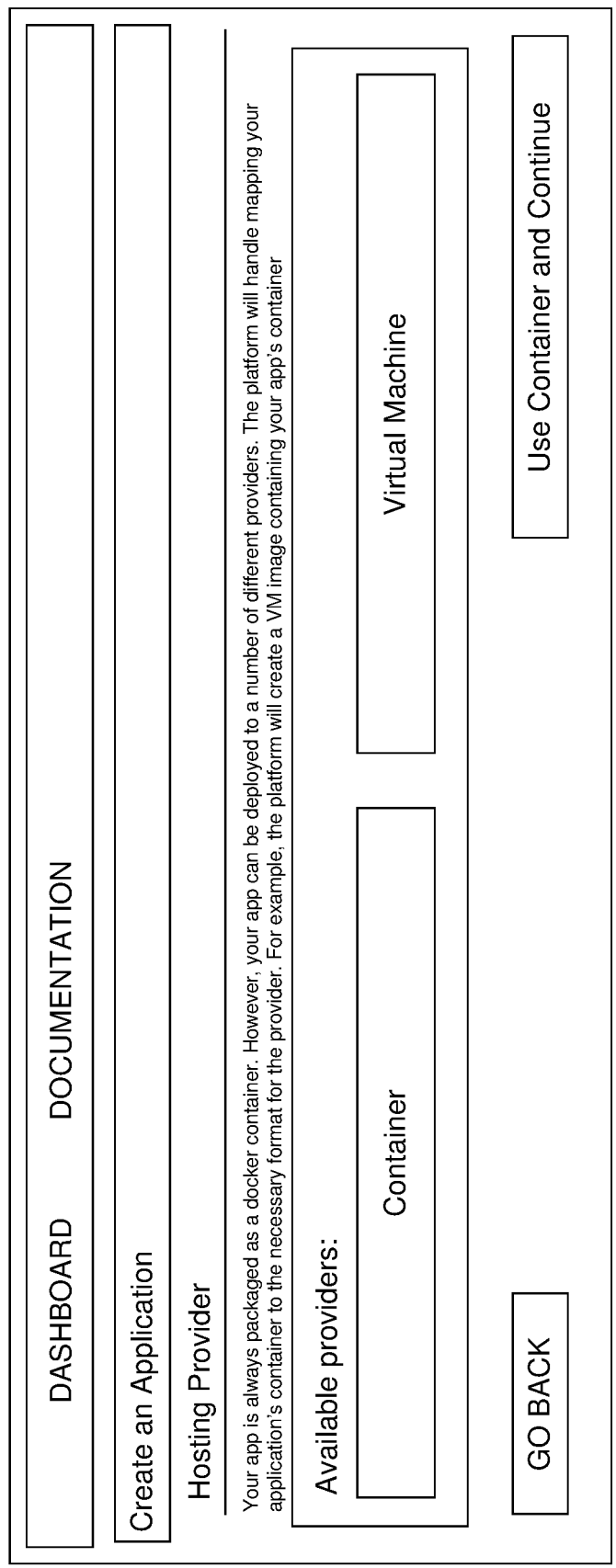
FIG. 8 is an example user interface for selecting a host provider type.

User interface 500 includes a list of teams 506 that the current user is part of. At step 212, initialization module 104 receives a selection of one of the displayed teams 506 by the user. At step 214, initialization module 104 identifies repository accounts that the current user has access to and displays those accounts as shown by account list 600 of the user interface of FIG. 6 at step 214. At step 216, initialization module 104 receives a selection of one of the displayed repository account. At step 218, initialization module 104 displays a list of project templates as shown in user interface 700 of FIG. 7. Each template in the list of templates 702 of FIG. 7 represents a set of files that can be used to write software within a particular coding environment. At step 220, initialization module 104 receives a selection of one of the displayed project templates. Upon receiving the selection of the project template, initialization module 104 displays user interface 800 of FIG. 8, which allows the user to select a hosting provider type for a server group that the application will be deployed to. In accordance with one embodiment, the hosting provider type can either be a container or a virtual machine. For the container provider type, the application is deployed to a node in a container execution environment. For a virtual machine provider type, the application is deployed to a virtual machine. At step 222 of FIG. 2, the selection of the host provider type is received by initialization module 104.

With the selection of the host provider type, initialization module 104 displays user interface 900 of FIG. 9, which allows the user to set constraints for where the workload for this application should be deployed at the end of the deployment sequence discussed further below. FIG. 9 includes a class selection control 902 which allows the user to select a class of computer systems on which the application will eventually be deployed. In accordance with one embodiment, the user can select between one or more internal datacenters, one or more external datacenters provided by third parties, and various collections of computer systems that are distributed throughout different locations associated with the enterprise. In particular, in accordance with one embodiment, the user may select a class of computer systems that consist of a separate computer system for each store that is part of a retail company. The computer system for a store may be located within the store or may be located in a datacenter external to the store but assigned to the store.

Figure 10:
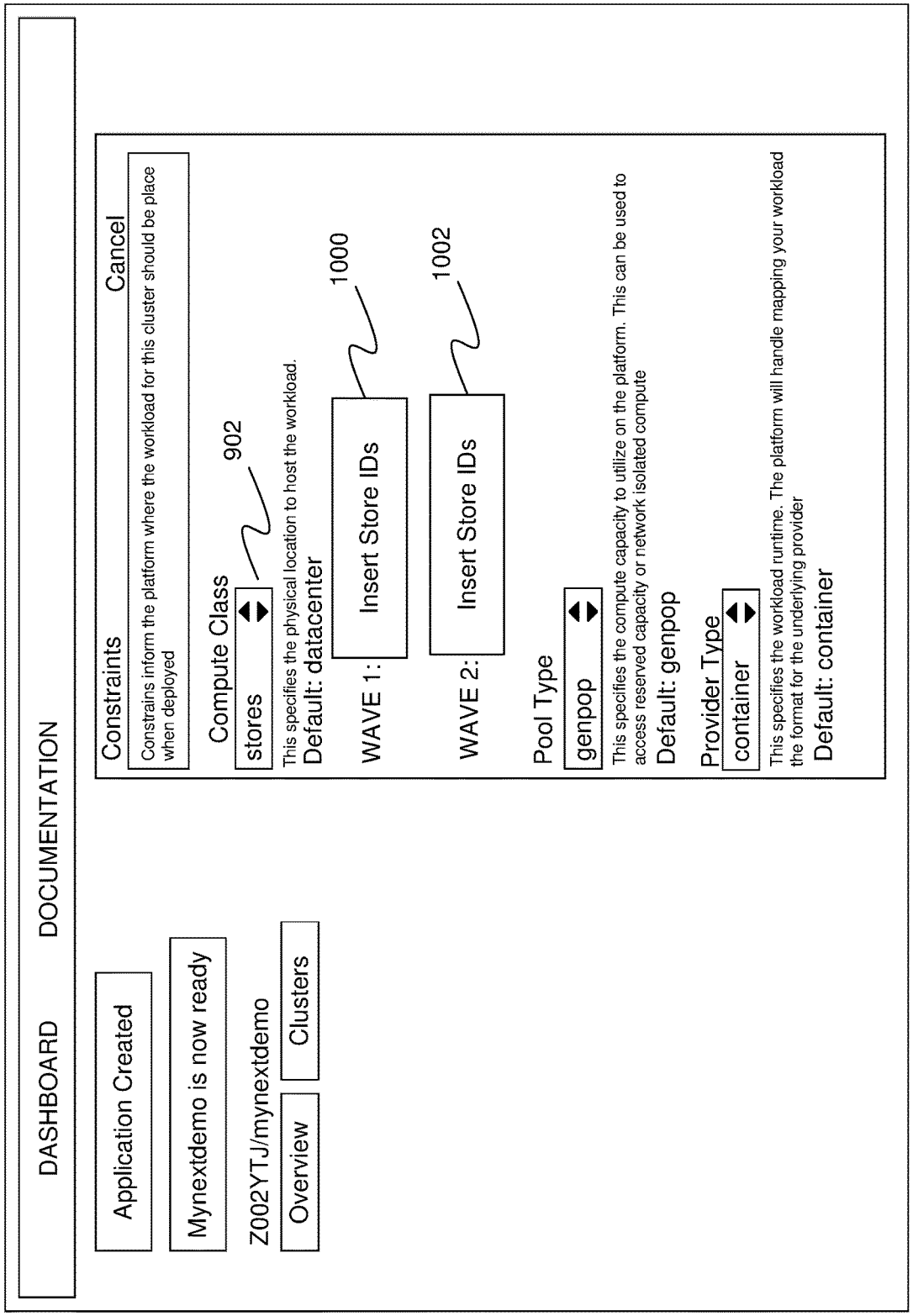
FIG. 10 is an example user interface for setting computer system identifiers for a variable wave of deployment.

When a class of computer systems is selected using control 902 that consists of a number of different computer systems that can be individually identified, such as the selection of the "stores" class in FIG. 10, user interface 900 is adjusted by initialization module 104 to include input boxes that allow the user to select particular computer systems of the class for one or more waves/steps of the deployment pipeline. For example, in FIG. 10 two input boxes 1000 and 1002 are displayed that allow the user to designate particular computer systems that the application should be deployed to during Wave 1 and Wave 2, respectively, of the deployment pipeline. In accordance with one embodiment, the user is not required to insert the identifiers for the particular computer systems at step 224 but instead is simply given the option of doing so. If the user does not provide the identifiers for the particular computer systems at step 224, the user will be provided with an opportunity later to set those IDs when deploying the application. In accordance with one embodiment, the number of computer systems that can be entered in input boxes 1000 and 1002 is limited to ensure that during the corresponding deployments the application is only deployed to a subset of all of the computer systems of the class. This prevents faulty applications from negatively impacting all of the computer systems of the class in the enterprise and instead limits the effects of faulty applications on the enterprise.

Figure 11:
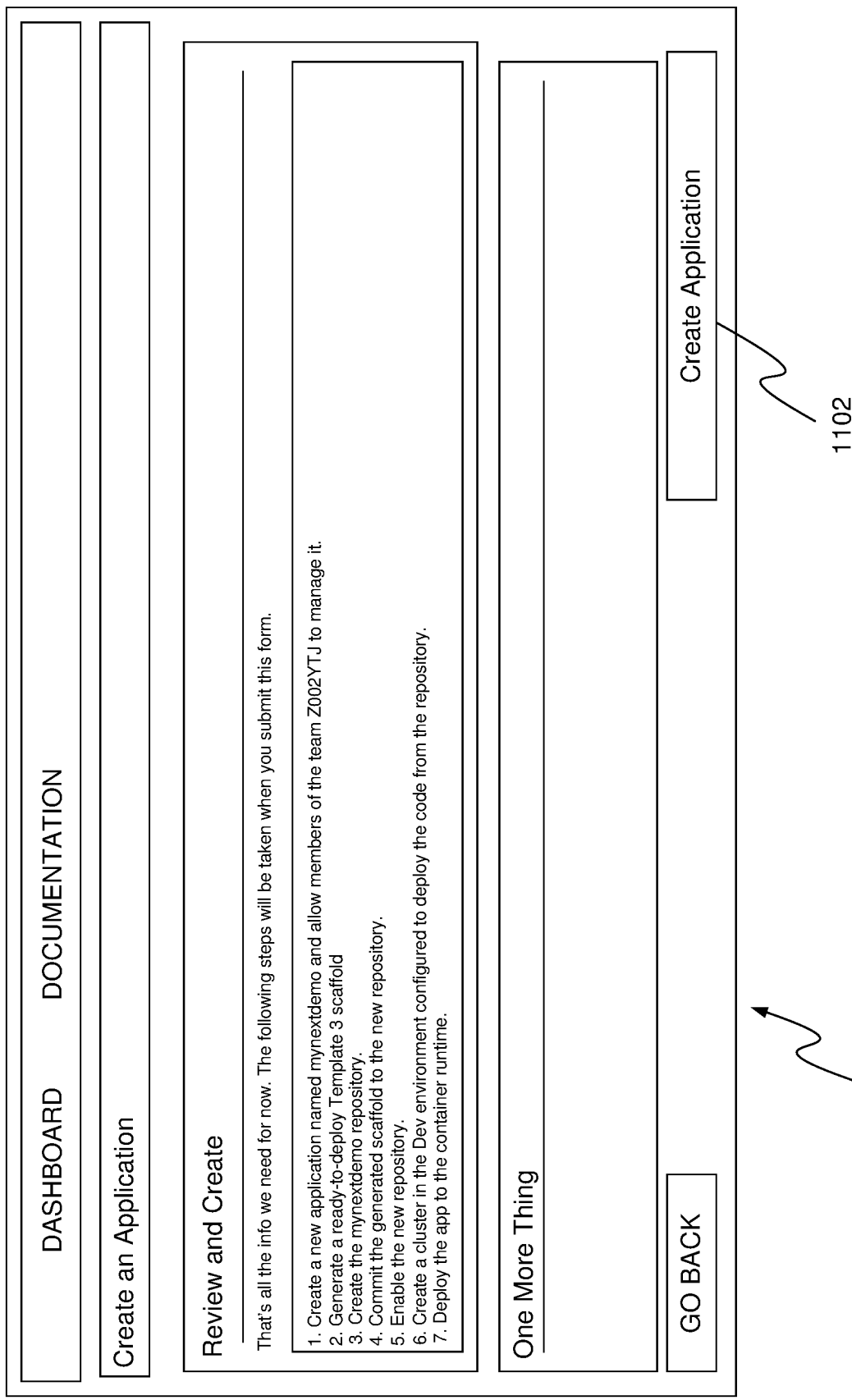
FIG. 11 is an example user interface confirming the actions that the application platform will take to initialize the development environment.

Initialization module 104 then displays a review user interface 1100 of FIG. 11 and indicates the steps that application platform 102 will take upon receiving selection of a create application control 1102 of FIG. 11. At step 226, create application control 1102 is selected. In response, at step 228, initialization module 104 creates a source code repository for the new application in the account selected at step 216 using source code manager 110 of FIG. 1 resulting in source code repository 112. At step 230, a scaffold of files is created by initialization module 104 using source code manager 110 and is committed to source code repository 112. The scaffold files are selected based on the project template selected at step 218. In accordance with one embodiment, the files are simply copied or cloned and then committed to source code repository 112.

At step 232, the commitment of the scaffold files to source code repository 112 causes an image constructor 114 to build a binary image from the scaffold files and to store that binary image in a binary repository 116 at step 232. A hook in image constructor 114 is then activated by the build of the binary image and causes a pipeline controller 118 to request the formation of a server group 129 in a development computer system 120 at step 234. In accordance with one embodiment, this request is made to a server group controller 132 of application platform 102. Server group 129 includes one or more host servers 126 that will execute an application and a cluster controller server 128 that will coordinate workloads among the host servers 126. The servers can either be implanted as nodes within a container execution environment or virtual machines depending on the host provider type selected during step 222. Application platform 102 includes a machine database 130 that lists the physical machines that constitute development computer system 120.

Once the server group has been created at step 234, pipeline controller 118 deploys the image in binary repository 116 to the server group at step 236. In accordance with one embodiment, pipeline controller 118 deploys the image using a deployment façade 134, a platform intelligence engine 136 and a deployment-specific façade 138. Deployment façade 134 provides the image in binary repo 116 to platform intelligence engine 136. Platform intelligence engine 136 uses the host provider type and information about the provisioning software being used to provide the server group to select one of domain-specific façades 138, 142 and 144, which is specifically designed to deploy to the host provider type and provisioning software.

Once the application has been initialized, software developers modify the source code to create a new version of the application. When the developers believe the application is ready for deployment, they commit their changes to source code repository 112 to trigger deployment of the application. Pipeline controller 118 provides and enforces a deployment pipeline consisting of a sequence of waves or steps of deployment. During each wave, the latest build of an application is deployed to one or more computer systems designated for the wave. In accordance with most embodiments, the pipeline consists of an initial deployment to one or more computer systems in a development environment, another wave of deployment to computer systems designated by one of the team members of the team responsible for the code, and another wave of deployment to a fixed collection of computer systems that all applications supported by application platform 102 are deployed to. In accordance with one embodiment, the deployment pipeline consists of:

Wave 0: Deployment to a Development Environment

Wave 1: Deployment to a first collection of user-selected computer systems in a Production Environment.

Wave 2: Deployment to a second collection of user-selected computer systems in the Production Environment.

Wave 3: Deployment to a small collection of computer systems in the Production Environment that all applications are deployed to.

Wave 4: Deployment to a larger collection of computer systems in the Production Environment that all applications are deployed to.

Wave 5: Deployment to all computer systems of the selected class of computer systems in the Production Environment, which all applications are deployed to.

In the description above, the Development Environment is an environment in which test data is used to evaluate the performance of the application while the Production Environment is an environment in which actual data is used and the results produced by the application are used in an attempt to complete an enterprise's objectives.

Waves 1 and 2 above allow the team writing the code to select computer systems where their code should be initially deployed in the production environment. By allowing the team writing the code to select these computer systems, the application platform allows the team to evaluate the performance of the application in computer systems that have specific characteristics that will affect the application. For example, some computer systems receive different forms of data or are required to produce different outputs than other computer systems. By selecting such computer systems during the early waves of deployment, the team can assess whether the application is properly coded for these special cases without exposing the computer systems of the entire enterprise to the application. If a fixed set of computer systems is used for each wave of deployment, it is possible that none of the computer systems that are particularly impacted by the application or in which the application behaves differently will be in the fixed set of computer systems. As a result, the team would not be able to evaluate the performance of the application in these unusual computer systems before deploying the application to all of the computer systems in the enterprise. By allowing the team to select the computer systems that the application is deployed to, the present embodiments provide more meaningful deployment on a limited set of computer systems. Because the application's developers select the computer systems for Waves 1 and 2, these waves are considered to be user-defined and variable since different applications will deploy to different sets of computer systems during Waves 1 and 2.

The later fixed waves of deployment (also referred to as set or universal waves of deployment) in the deployment pipeline of the present embodiments, such as waves 3 and 4 above, prevent a team from deploying directly to all computer systems in an enterprise after deploying to a small hand-selected collection of computer systems. By ensuring that each application is deployed to the same subset of computer systems before being deployed enterprise-wide, these small fixed waves of deployment can detect problems in applications that have been adjusted to work within specific computer systems but that will fail in more general computing systems. By using a smaller set of computer systems in these fixed waves than is found in an enterprise-wide deployment, the number of computer systems affected by improperly coded applications is reduced.

Figure 12:
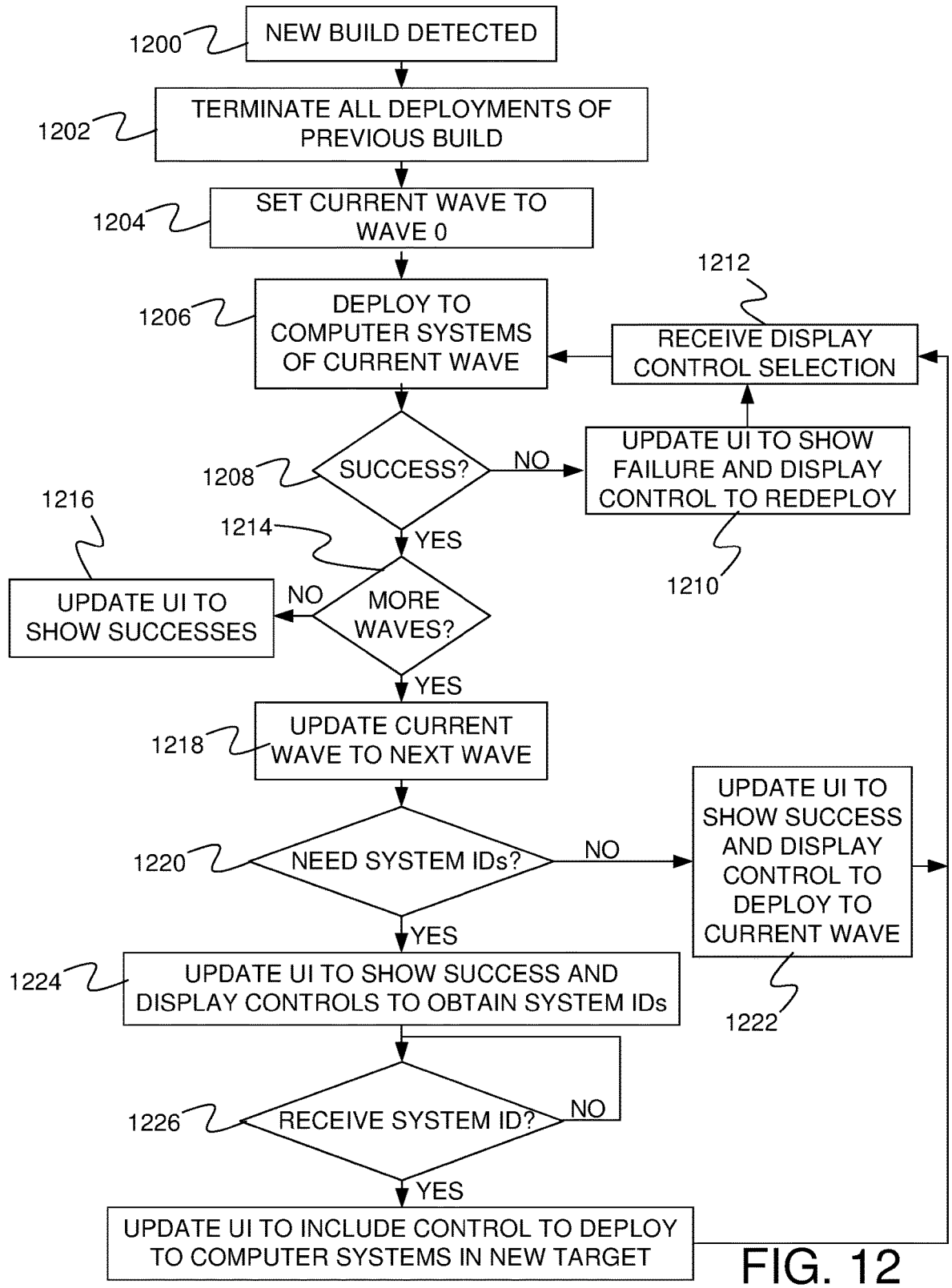
FIG. 12 is a flow diagram of a method of deploying an application using a deployment pipeline.

FIG. 12 provides a flow diagram of a method of executing a deployment pipeline in accordance with one embodiment. In step 1200, a new build of an application is detected. In accordance with one embodiment, this detection is performed through a hook placed in image constructor 114, which calls pipeline controller 118 anytime image constructor 114 creates a new build of an application. The hook includes an identifier of the application that was built.

In response to the detection of the new build, pipeline controller 118 terminates all deployments of the previous build at step 1202. To do this, pipeline controller 118 accesses deployment history database 140 to identify all computer systems where the previous build of the application was deployed during the execution of the deployment pipeline for the previous build. Pipeline controller 118 then instructs server group controller 132 to terminate each server of each server group that the previous build was deployed to. The server groups can be distributed across numerous computer systems as identified in deployment history database 140. Pipeline controller 118 also prevents any further deployments of the previous build of the application.

At step 1204, pipeline controller 118 sets a current wave of deployment to the first wave of the deployment pipeline: Wave 0. At step 1206, pipeline controller 118 deploys the new build of the application in binary repository 116 to the computer systems set for the current wave of deployment. To do this, pipeline controller 118 first retrieves a host provider type stored for the application in application platform 102. In accordance with on embodiment, this host provider type can either be a container or a virtual machine. In addition, pipeline controller 118 retrieves a number of server instances that are to be created in each server group that will be receiving the build. For applications that use a container runtime, the number of servers represents the number of nodes to be controlled by the control plane in the container orchestration software and for applications that use a virtual machine host provider, each server represents a separate virtual machine. Pipeline controller 118 then instructs server group controller 132 to create a server group in each computer system for the current wave. When step 1206 is first executed, this involves creating a server group 129 in the development environment computer system 120 consisting of a host server 126 and a cluster controller server 128 with host server 126 being configured to host the application image and cluster controller server 128 being configured to execute a cluster controller 124. If multiple servers are needed to deploy multiple instances of the application, multiple host servers 126 are created.

After the server group has been started, pipeline controller 118 uses deployment façade 134, platform intelligence engine 136 and one or more deployment-specific façades 138, 142 and 144 to deploy the application image from binary repository 116 to the host servers in the server group. Platform intelligence engine 136 selects the deployment-specific façade 138, 142 or 144 depending on the host provider type, either container or virtual machine, and the particular software implementing that host provider type. Thus, if different computer systems utilize different software to implement the host provider type, platform intelligence engine 136 will use the correct deployment-specific façade for each computer system.

Figure 13:
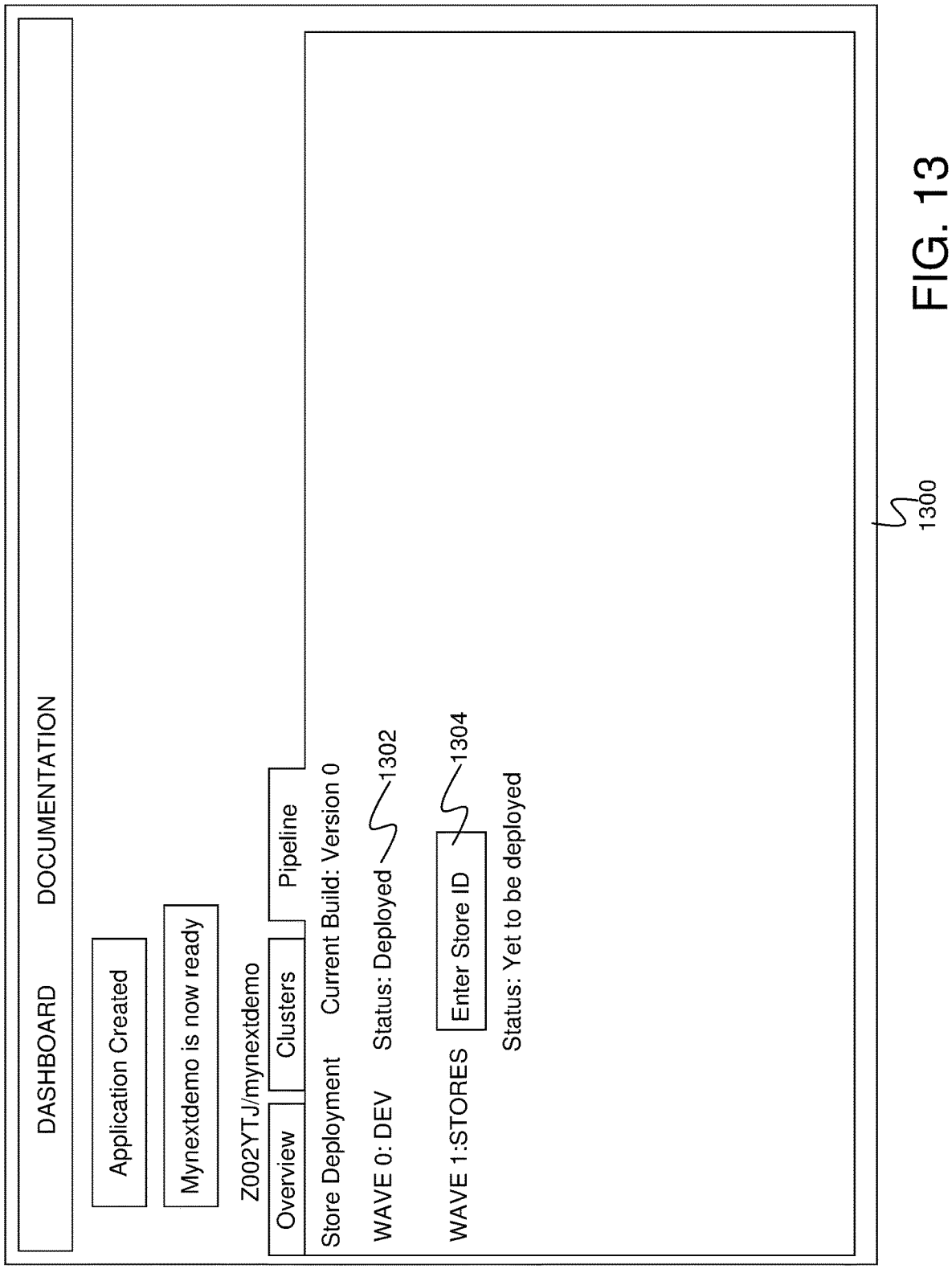
FIG. 13 is an example user interface showing deployment status and waiting for entry of computer system identifiers.

At step 1208, pipeline controller 118 determines if the deployment was successful. If the deployment was successful, pipeline controller 118 determines if there are more waves in the deployment pipeline at step 1214. If there are more waves, pipeline controller 118 updates the current wave to the next wave at step 1218. At step 1220, pipeline controller 118 determines if the new current wave needs system identifiers in order to determine what computer system the application should be deployed to. When system IDs are needed for the new current wave, pipeline controller 118 updates user interface 106 to show the success of the previous wave of deployment and to display controls to obtain the system IDs. FIG. 13 provides an example of a user interface 1300 showing the user interface updated at step 1224. In user interface 1300, the deployment to the development environment is shown as being successful by designation 1302 and a textbox 1304 is provided to obtain system identifiers for the computer systems where the application is to be deployed in Wave 1 of the deployment pipeline. In FIG. 13, the computer system IDs are referred to as store IDs since each computer system is associated with a particular store. In some embodiments, these computer systems are located in the stores corresponding to the store IDs while in other embodiments, the computer systems are located in a data center but are dedicated to executing applications for the store corresponding to the store IDs. In accordance with one embodiment, text box 1304 is limited to receiving a set number of computer system IDs such that the user is prevented from entering too many system IDs. This limits the impact of the wave of deployment on the computer systems of the enterprise by ensuring that the application is only deployed to a subset of all computer systems in the enterprise during Wave 1 of the deployment.

Figure 14:
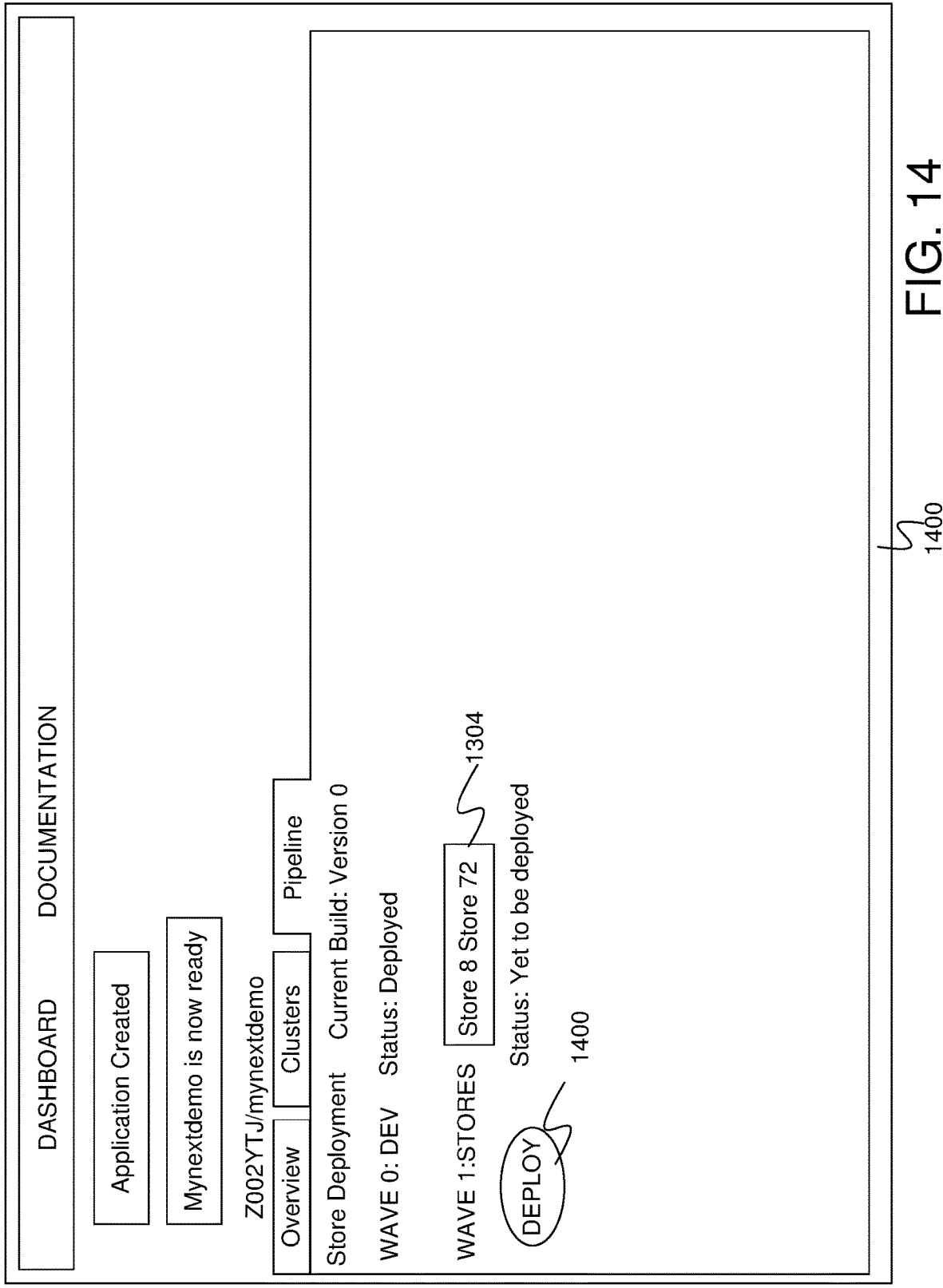
FIG. 14 is an example user interface showing deployment status and a control for executing Wave 1 of the deployment pipeline.

At step 1226, pipeline controller 118 determines if at least one system ID has been provided in textbox 1304. If no system ID has been provided, pipeline controller 118 waits at step 1226 until a system ID is provided. When a computer system identifier is received at step 1226, pipeline controller 118 updates the user interface to include a control for deploying the current wave of the deployment pipeline. Such a control is shown as deployment control 1400 in user interface 1402 of FIG. 14. As shown in FIG. 14, two computer system identifiers, "store 8" and "store 72" have been added to textbox 1304 by the user. When the user selects deployment control 1400, that selection is received by pipeline controller 118 at step 1212 and the application in binary repository 116 is deployed to the computer systems of the current wave at step 1206. For example, when deployment control 1400 of FIG. 14 is selected, the computer systems identified by "store 8" and "store 72" will receive the deployment of the application in binary repository 116. In order to deploy to these computer systems, pipeline controller 118 first identifies the physical machines associated with the identifiers provided in textbox 1304. These physical machines may be located within a building represented by the identifier or may be housed in some other location. For example, the computer systems can be located within a particular store or may be located in a datacenter separate from the store. The unique identifiers of the physical machines for each identifier provided in textbox 1304 are stored in machine database 130 in accordance with one embodiment. Pipeline controller 118 then instructs server group controller 132 to create a server group in each computer system having the number of servers specified for the application and being of the type set for the application such as a container or a virtual machine. For example, based on the inputs of FIG. 14, pipeline controller 118 instructs server group controller 132 to create a server group 150 for the computer system designated for store 8 and a server group 152 for the computer system designated for store 72. Server group 150 includes a host server 154 and a cluster controller server 156 while server group 152 includes a host server 158 and a cluster controller server 160. Additional host servers can be included in either server group 150 or server group 152 to provide the number of instances set for the application. Once the server groups have been instantiated by server group controller 132, pipeline controller 118 deploys the image in binary repository 116 to each of the host servers using deployment façade 134, platform intelligence engine 136 and one or more of deployments-specific façades 36, 142 and 144. As shown in FIG. 1, server group 152 uses deployment-specific façade 144 while server group 150 uses deployment-specific façade 142. This occurs when the computer system of store 8 executes different clustering software than the computer system of store 72.

Figure 15:
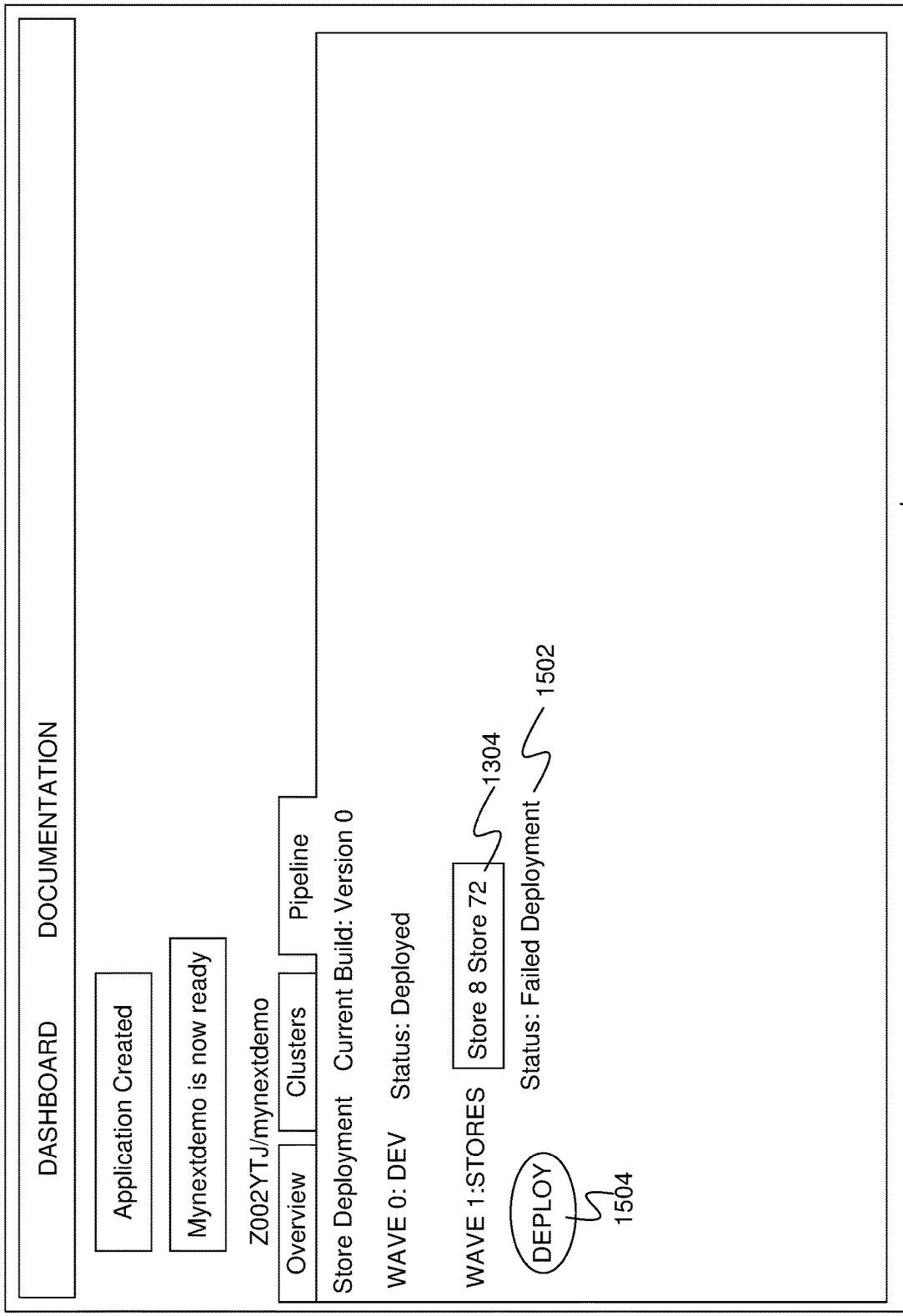
FIG. 15 is an example user interface showing a failed deployment of Wave 1 with a control for redeploying Wave 1.

The process of FIG. 12 then returns to step 1208 to determine if the deployment of Wave 1 was successful. If the deployment was not successful at step 1208, pipeline controller 118 updates user interface 106 to show that the deployment failed and to display a control to redeploy the application at step 1210. The update user interface allows redeployment of the current wave but prevents deployment of any waves after the current wave. Thus, the current wave must at least deploy successfully before the application's developers are allowed to trigger the next wave of deployment. FIG. 15 provides an example of a user interface 1500 showing a failed deployment designation 1502 for Wave 1 and a control 1504 to allow redeployment to the computer systems listed in textbox 1304. When a user selects control 1504, the process returns to step 1212 where pipeline controller 118 receives the selection of that control. Pipeline controller 118 then tries to redeploy the application to any computer system where the deployment failed.

When the deployment of Wave 1 is successful at step 1208, the method of FIG. 12 determines that there are more waves at step 1214 and sets Wave 2 as the current wave at step 1218. At step 1220, pipeline controller 118 determines that system IDs have already been received for Wave 2 even though Wave 2 involves deploying the application to computer systems designated by the application's developers. This can occur when the application's developers provide the system identifiers during the initial creation of the application as discussed in FIG. 2 above. Thus, the application's developers can provide custom designations of computer systems for Wave 1 and Wave 2 during either the initial creation of the application or during execution of the deployment pipeline.

Figure 16:
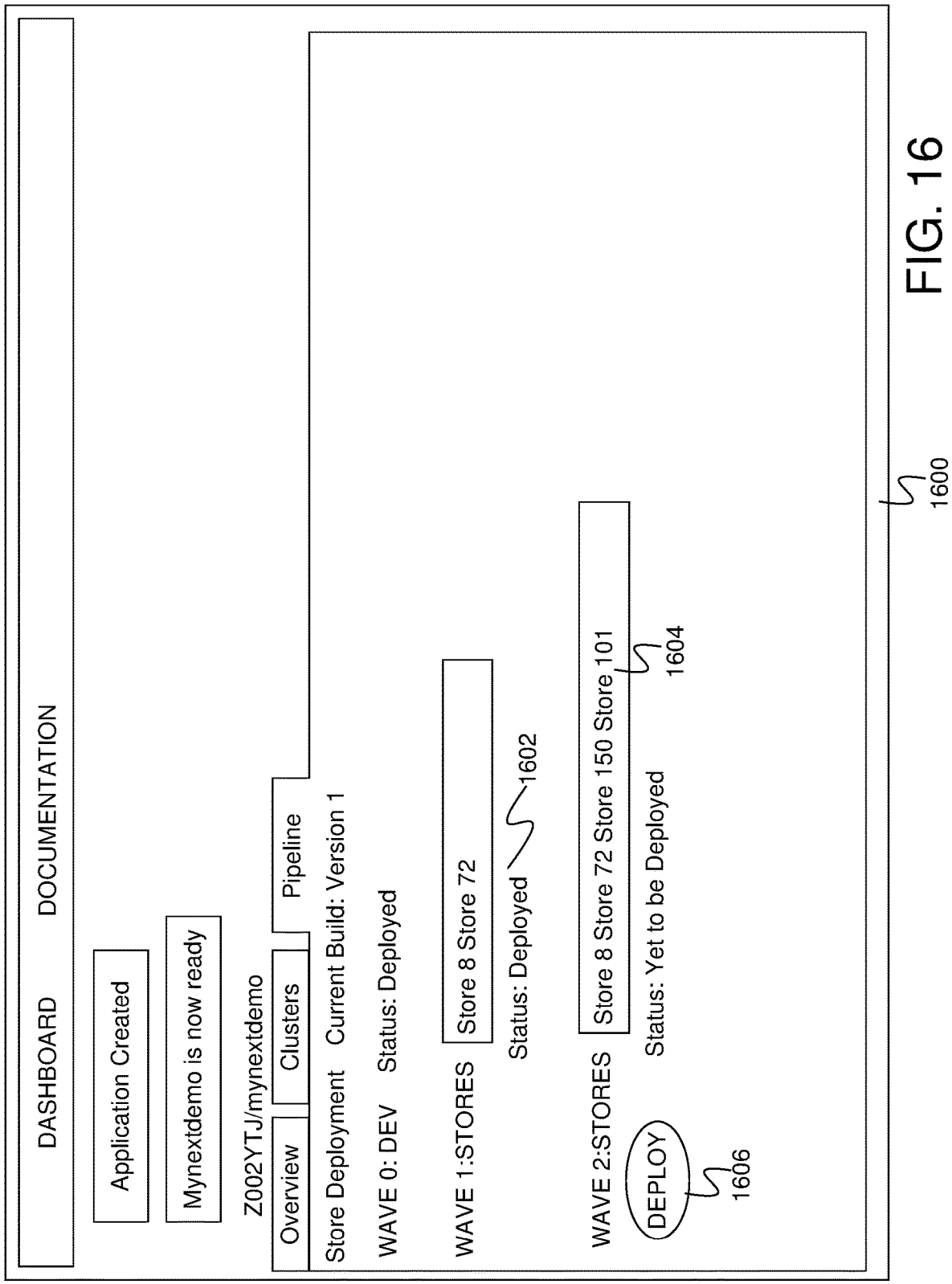
FIG. 16 is an example user interface showing deployment status and a control for executing Wave 2 of the deployment pipeline.

When the system IDs have already been provided for Wave 2 at step 1220, pipeline controller 118 produces an updated user interface 1600 (FIG. 16) at step 1222 to show the success of Wave 1 with deployed designation 1602 and a control 1604 for deploying Wave 2 of the deployment pipeline. In user interface 1600, a text box 1604 is provided to allow the application's developer to remove or add system identifiers to change what computer systems will be deployed to during Wave 2. In accordance with one embodiment, text box 1604 limits the number of system identifiers that can be placed in text box 1604 so that the application's developer is only able to designate a subset of the computer systems in the enterprise to thereby limit the adverse effects of errors in the application. In accordance with one embodiment, the applications developers are allowed to designate more system IDs for Wave 2 than for Wave 1.

After step 1222, the process of FIG. 12 continues at step 1212 where pipeline controller 118 receives selection of deploy control 1606. In response, pipeline controller 118 deploys the build of the application in binary repository 116 to the computer systems corresponding to the store IDs in text box 1604 at step 1206. This deployment involves the creation of server group 160 for store 150 and server group 162 for store 101 with server group 160 consisting of one or more host servers 164 and a cluster controller server 166 and server group 162 consisting of one or more host servers 168 and a cluster controller server 170. After the server groups have been created, the image in binary repository 116 is deployed to each host server in each computer system.

Figure 17:
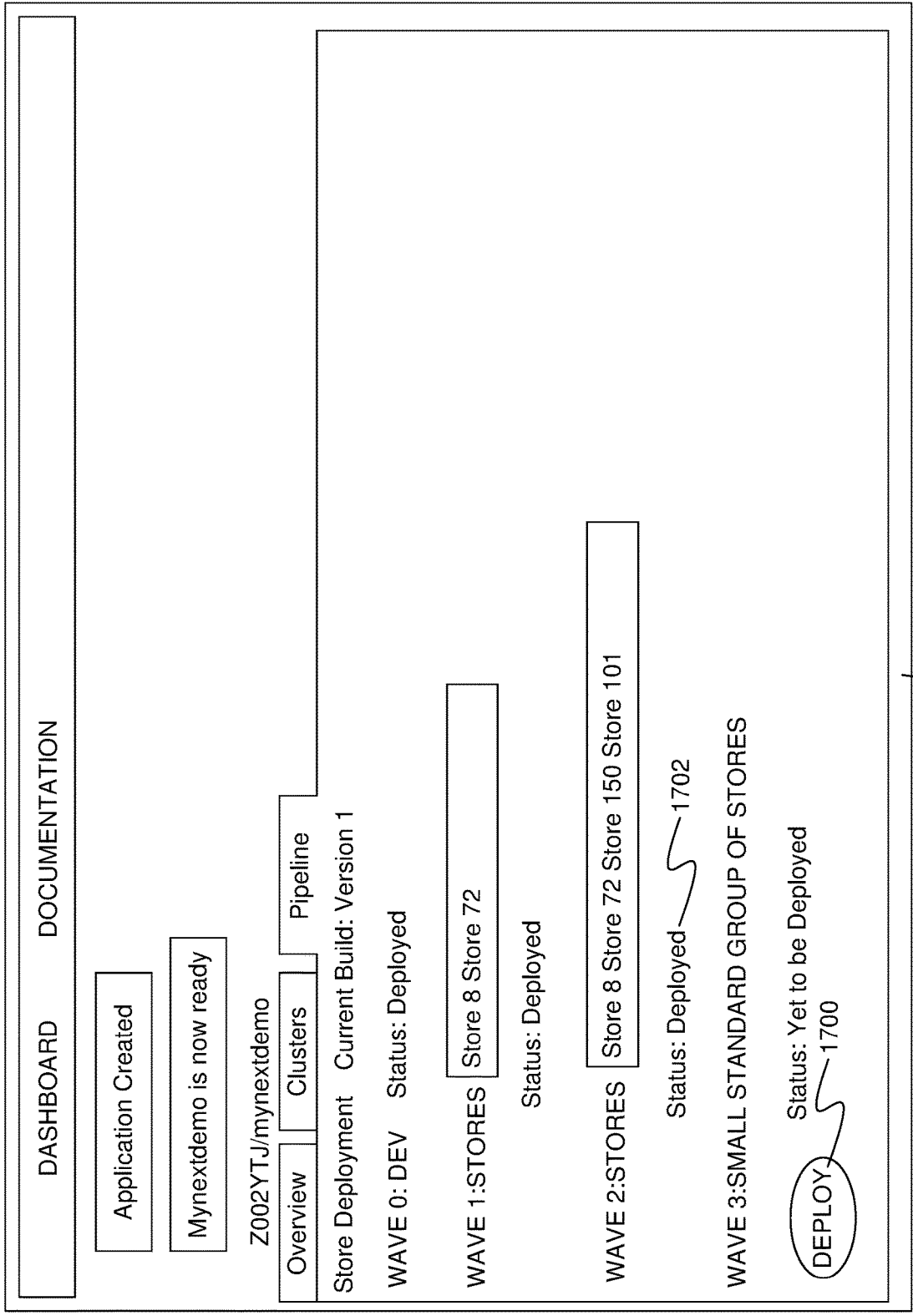
FIG. 17 is an example user interface showing deployment status and a control for executing Wave 3 of the deployment pipeline.

If the deployment of the application to the Wave 2 computer systems is successful at step 1208, the process continues through step 1214-1218 where the current wave is set to Wave 3. Wave 3 involves deploying the application to a subset of the computer systems in the enterprise. This small set applies to all applications that use the deployment pipeline (and is therefore referred to as being a universal subset) such that each application will be deployed to the subset of computer systems in Wave 3. Since no identifiers are needed from the user to identify the computer systems for Wave 3 at step 1220, pipeline controller 118 executes step 1222 and displays user interface 1700 in FIG. 17, which shows the success of the deployment of Wave 2 with designation 1702 and includes deploy control 1704 for deploying the application to the computer systems of Wave 3.

Returning to step 1212, selection of deploy control 1704 is received and in response, pipeline controller 118 deploys to the computer systems designated for Wave 3. One or more of the computer systems listed for Wave 3 may have been selected by the application's developers for either Wave 1 or Wave 2. In such cases, pipeline controller 118 does not redeploy the application image to those computers. As described above, the deployment to a computer system involves using server group controller 132 to create a new server group and then deploying the application to at least one host server in that server group.

Figure 18:
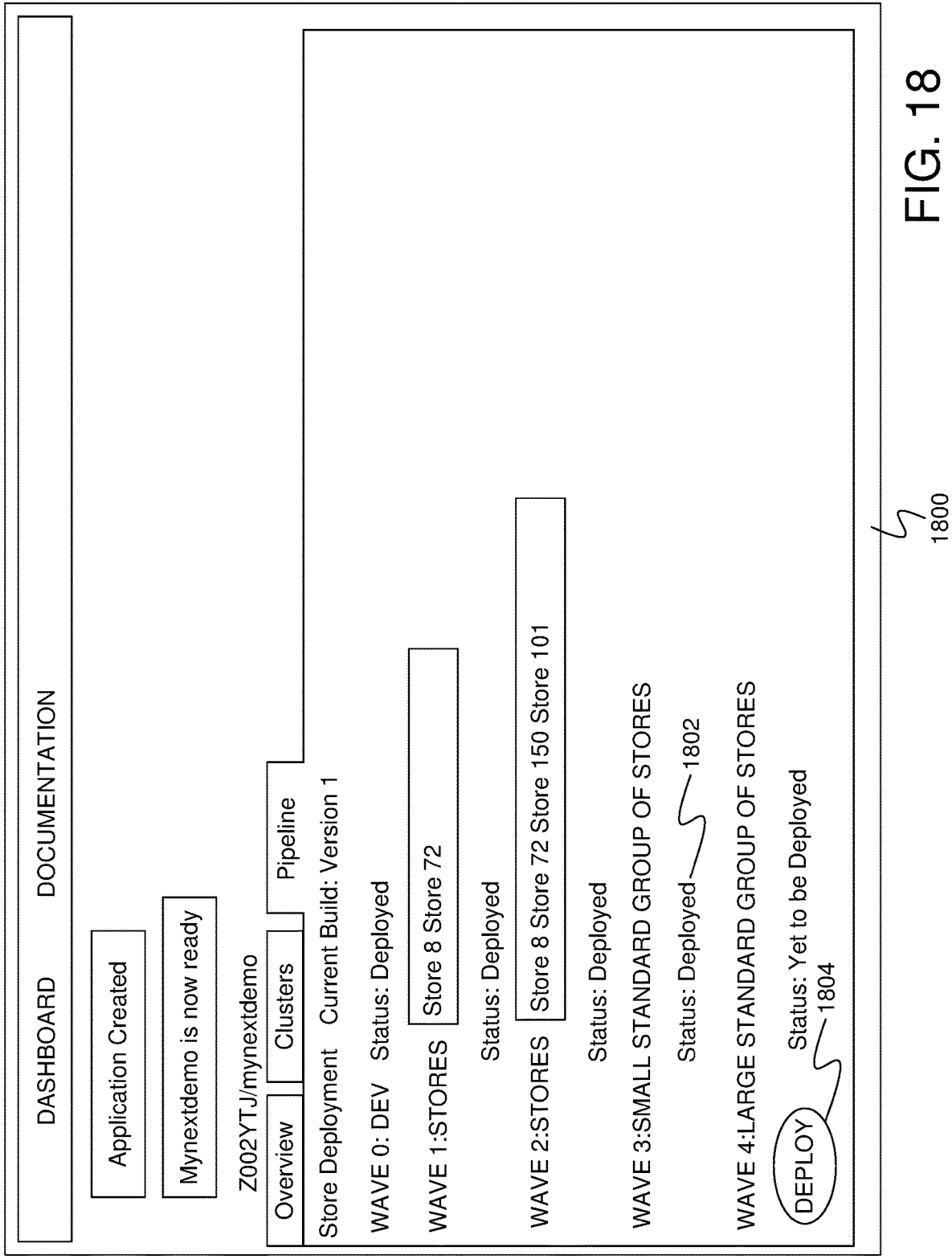
FIG. 18 is an example user interface showing deployment status and a control for executing Wave 4 of the deployment pipeline.
Figure 19:
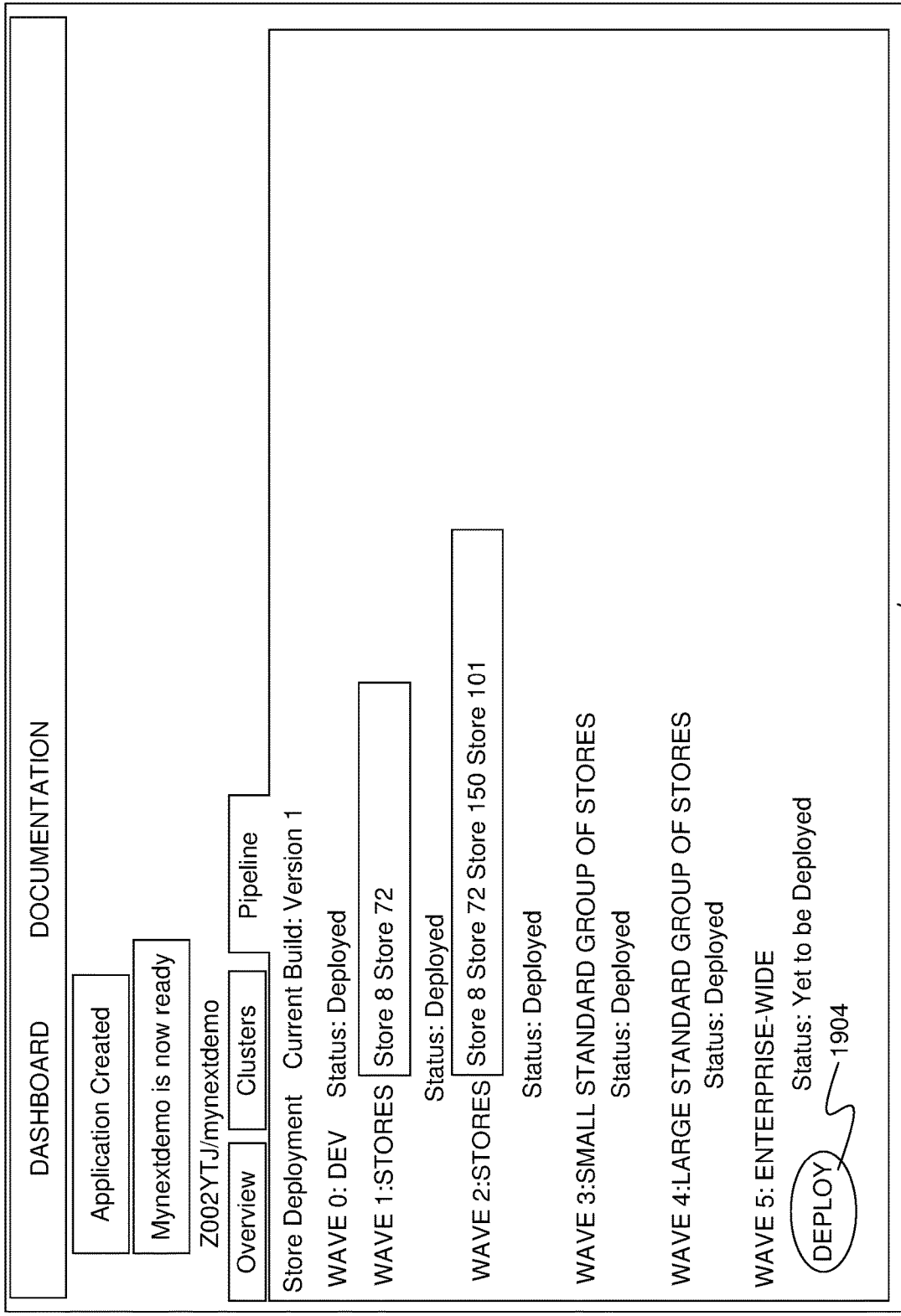
FIG. 19 is an example user interface showing deployment status and a control for executing Wave 5 of the deployment pipeline.
Figure 20:
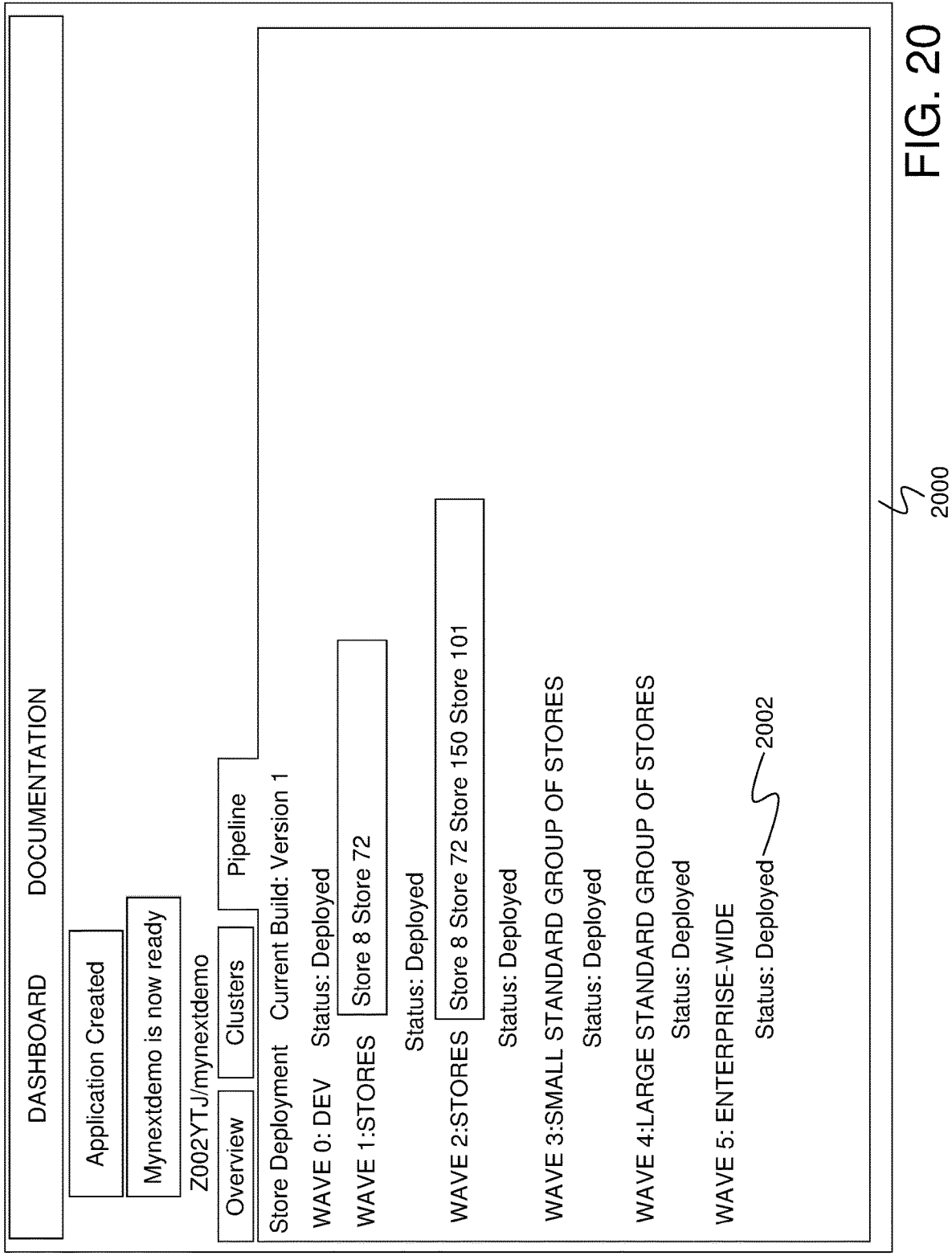
FIG. 20 is an example user interface showing deployment status for the entire deployment pipeline.

If the deployment is successful at step 1208, the current wave is updated to Wave 4 at step 1218. Wave 4 consists of a larger set of computer systems that are applied to all applications that use the deployment pipeline. Since this selection of computer systems is selected without input from the application's developers, no identifiers are needed for the computer systems at step 1220 and user interface 1800 of FIG. 18 is displayed at step 1222. User interface 1800 includes a designation 1802 to indicate that Wave 3 was successful and a control 1804 for requesting deployment of Wave 4.

Returning to step 1212, selection of control 1804 is received and pipeline controller 1800 deploys the application to the larger group of computer systems designated for Wave 4. If a computer system of Wave 4 was deployed to in any of Waves 1, 2 or 3, the application is not redeployed to those computer systems at step 1206.

If the deployment of Wave 4 is successful, the current wave of deployment is updated to Wave 5 at step 1218. In accordance with one embodiment, the computer systems of Wave 5 consist of all the computer systems of a particular class of computer systems in the enterprise. For example, Wave 5 can deploy to a separate computer system for each store in a retail enterprise. Since no identifiers for the computer systems of Wave 5 are needed at step 1220, user interface 1900 is displayed at step 1222 showing successful deployment of Wave 4 through designation 1902 and a control 1904 to deploy to the computer systems of Wave 5.

Returning to step 1212, when control 1904 is selected by the user, pipeline controller 118 deploys the image of repository 116 to all of the computer systems of Wave 5. If any of the computer systems were deployed to in Waves 1-4, the application is not redeployed to those computer systems. If the deployment is successful at step 1208, pipeline controller 118 determines that there are no more waves of deployment at step 1214 and pipeline controller 118 updates user interface 106 to provide user interface 2000 showing that the deployment to the Wave 5 computer systems was successful through designation 2002.

Figure 21:
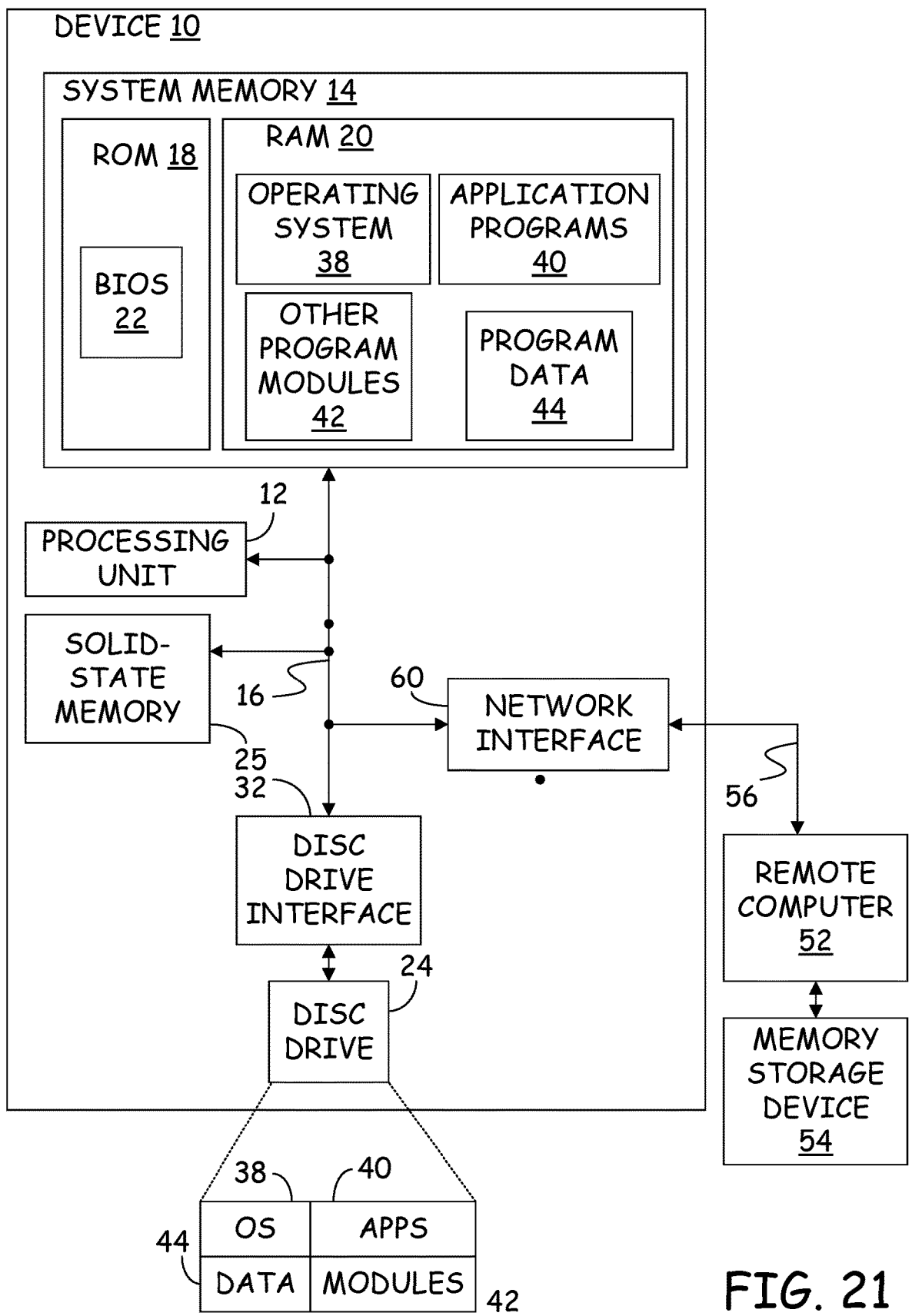

FIG. 21 provides an example of a computing device 10 that application platform 102, source control management 110, image constructor 114, client 108, deployment façades 134, 138, 142 and 144, platform intelligence engine 136 and the computer systems of the enterprise can be executed on. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24. Hard disc drive 24 is connected to the system bus 16 by a hard disc drive interface 32. The drive and its associated computer-readable media provide nonvolatile storage media for the computing device 10 on which computer-executable instructions and computer-readable data structures may be stored. Other types of media that are readable by a computer may also be used in the exemplary operation environment as non-volatile memory such as solid-state memory.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 21.

The computing device 10 is connected to remote computer 52 through a network interface 60.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 21 are exemplary and other means for establishing a communications link between the computers, such as a wireless interface communications link, may be used.

A display adapter may be provided in computing device 10 to permit user interfaces discussed above to be shown on a display.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
defining a deployment pipeline for each application of a collection of applications, the deployment pipeline comprising an ordered plurality of waves of deployment wherein the ordered plurality of waves of deployment comprises a set wave of deployment and a variable wave of deployment with the set wave of deployment comprising deployment to a plurality of locations that is the same for each application in the collection of applications;
for each application in the collection of applications, receiving a list of locations selected by a respective user for the variable wave of deployment such that two applications of the collection of applications deploy to different locations during their respective variable wave of deployment; and
receiving an indication that the build of the application has been created and in response, executing one of the plurality of waves of deployment.

2. The computer-implemented method of claim 1 wherein the ordered plurality of waves of deployment comprises a first wave of deployment to a development environment.

3. The computer-implemented method of claim 1 wherein the ordered plurality of waves of deployment comprise a prior wave of deployment and a latter wave of deployment that immediately follows the prior wave of deployment in the ordered plurality of waves of deployment and wherein the method further comprises:
attempting to execute the prior wave of deployment;
determining whether the prior wave of deployment was successful; and
using the determination to set at least one deployment control in a user interface.

4. The computer-implemented method of claim 3 wherein determining whether the prior wave of deployment was successful comprises determining that the prior wave of deployment was unsuccessful and wherein using the determination to set at least one deployment control comprises:

providing a deployment control in the user interface to allow the prior wave of deployment to be redeployed while preventing deployment of the next wave of deployment.

5. The computer-implemented method of claim 3 wherein determining whether the prior wave of deployment was successful comprises determining that the prior wave of deployment was successful and wherein using the determination to set at least one deployment control comprises:
providing a deployment control in the user interface to allow a user to request execution of the next wave of deployment.

6. The computer-implemented method of claim 1 wherein the variable wave of deployment precedes the set wave of deployment.

7. The computer-implemented method of claim 1 further comprising receiving an indication that a new build of the application has been created and in response executing one of the plurality of waves of deployment for the new build.

8. A machine comprising:
a memory; and
a processor executing instructions providing:
a deployment pipeline controller, the deployment pipeline controller providing a sequence of deployment steps for a build of an application, the deployment steps comprising a user-defined step in which the build is deployed to a plurality of systems selected by a user, a second user-defined step in which the build is deployed to a second plurality of systems selected by the user and a universal step in which the build is deployed to a plurality of systems selected for all builds that use the deployment pipeline controller, wherein the deployment pipeline controller limits the number of systems that the user can select for the user-defined step to fewer than the number of systems in the universal step and the user and wherein the user is restricted from changing which systems are in the plurality of systems in the universal step.

9. The machine of claim 8 wherein the user-defined step comes before the universal step in the sequence of steps.

10. The machine of claim 9 wherein upon creation of a new build of the application, the deployment pipeline controller prevents execution of deployment steps in the sequence of deployment steps for the build of the application.

11. The machine of claim 10 wherein upon creation of a new build of the application, the deployment pipeline controller terminates all deployed instances of the build of the application.

12. A method comprising:
receiving an indication of a build of an application;
executing at least part of a sequence of deployments of the build through steps comprising:
executing a deployment of the build to a set of computing systems designated specifically for the application;
only after deployment of the build to the set of computing systems designated specifically for the application, executing a deployment of the build to a set of computing systems designated for all applications that utilize the sequence of deployments.

13. The method of claim 12 further comprising receiving an indication of a new build of the application after deployment of the build of the application to the set of computing systems designated specifically for the application and in response terminating each instance of the build of the application on the set of computing systems designated specifically for the application.

14. The method of claim 13 further comprising in response to receiving the indication of the new build of the application, preventing execution of at least one deployment of the build of the application in the sequence of deployments.

15. The method of claim 14 wherein the user interface prevents the user from designating more computer systems than are in the set of computing systems designated for all applications that utilize the sequence of deployments.

16. The method of claim 12 further comprising providing a user interface to allow a user to designate the set of computer systems designated specifically for the application.

17. The method of claim 12 wherein executing the deployment of the build to the set of computing systems designated for all applications that utilize the sequence of deployments comprises:
determining that the build was deployed to a computer system that is in the set of computing systems designated for all applications that utilize the sequence of deployments during execution of the deployment of the build to the set of computing systems designated specifically for the application; and
not redeploying the build to the computer system.

* * * * *